(12) United States Patent
Westerman

(10) Patent No.: US 6,326,977 B1
(45) Date of Patent: Dec. 4, 2001

(54) RENDERING OF $YC_BC_R$ IMAGES ON AN RGS DISPLAY DEVICE

(75) Inventor: Larry Alan Westerman, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/185,386

(22) Filed: Nov. 3, 1998

(51) Int. Cl.[7] .................................................. G09G 5/04
(52) U.S. Cl. .................................... 345/591; 345/593
(58) Field of Search .......................... 358/518, 520, 358/527; 345/431, 132, 593, 591; 382/167, 166

(56) References Cited

U.S. PATENT DOCUMENTS

| | | | |
|---|---|---|---|
| 4,907,075 | 3/1990 | Braudaway | 358/75 |
| 5,068,644 | 11/1991 | Batson et al. | 340/701 |
| 5,130,701 | 7/1992 | White et al. | 340/701 |
| 5,170,152 | 12/1992 | Taylor | 340/703 |
| 5,233,412 | 8/1993 | Nishihara | 358/75 |
| 5,233,684 | 8/1993 | Ulichney | 395/131 |
| 5,341,464 | 8/1994 | Friedman et al. | 395/131 |
| 5,384,902 | 1/1995 | Carlsen | 395/131 |
| 5,398,120 | 3/1995 | Friedman et al. | 358/501 |
| 5,416,890 * | 5/1995 | Beretta | 345/431 |
| 5,424,755 | 6/1995 | Lucas et al. | 345/155 |
| 5,432,893 * | 7/1995 | Blasubramanian et al. | 345/431 |
| 5,450,216 | 9/1995 | Kasson | 358/518 |
| 5,479,594 | 12/1995 | Lum | 395/143 |
| 5,598,186 | 1/1997 | Edgar | 345/154 |
| 5,673,065 | 9/1997 | DeLeeuw | 345/153 |
| 5,937,089 * | 8/1999 | Kobayashi | 382/167 |
| 6,078,307 * | 6/2000 | Daly | 345/132 |

* cited by examiner

Primary Examiner—Matthew Luu
Assistant Examiner—Chante' Harrison
(74) Attorney, Agent, or Firm—Chernoff, Vilhauer, McClung & Stenzel, LLP

(57) ABSTRACT

Color images are processed in a digital electronic device as data in the $YC_BC_R$ (YUV) (luminance, chrominance-blue, chrominance-red) color space. However, output devices usually require the color data to be converted to RGB (red, green, blue) data and may have a color resolution less than the color resolution of the original image. The present invention provides a method of constructing a perceptually optimized color palette useful in converting higher resolution images of $YC_BC_R$ data to lower resolution images of RGB data. To construct the palette the RGB color gamut is defined in the $YC_BC_R$ color space. The $YC_BC_R$ color space is divided into a grid of colors equally spaced along the $C_B$ and $C_R$ axes and perceptually equally spaced along the luminance, Y, axis. Colors in the grid are moved to the boundary of the RGB color gamut in each luminance plane to ensure maximally saturated colors. Substitutions for colors in the palette can also be made if incremental adjustment of coordinates of colors not on the boundary of the gamut of output colors reduces the variation of the palette colors.

20 Claims, 3 Drawing Sheets

RENDERING OF YC$_B$C$_R$ IMAGES ON AN RGS DISPLAY DEVICE

BACKGROUND OF THE INVENTION

The present invention relates to image processing and more particularly, to the construction of a perceptually optimized color palette for use in displaying an original image of higher color resolution on a device with lower color resolution.

Color images are commonly processed by computers and other digital electronic systems as bitmaps. A bitmap is an array of data representing the color of each picture element or pixel of the image. Since data is required to represent each pixel of an image, the memory necessary to store the image and the time necessary to process the image are determined both by the total number of pixels making up the image and the number of data bits used to describe the color of each pixel, known as the bit depth. The color resolution of a system or subsystem is the total number of colors which can be simultaneously used to reproduce the image. The color resolution is a function of the bit depth. The number of colors that can be simultaneously displayed (C) is given by the function $C=2^N$, where N is the bit depth. For a system with a bit depth of 24, the color of a pixel can be selected from 16.7 million colors while only 256 colors are available for each pixel in a system with a bit depth of eight bits. Image quality improves with greater bit depth since the perceived "true color" of an image pixel is more likely to be found in a palette of 16.7 million colors than in a palette of 256 colors. On the other hand, three times more memory is required to store an image having 24 bit resolution than eight bit resolution. Likewise, greater bit depth increases the processing requirements and may not be useful with some display technologies, such as LCD devices. The ability to reproduce images at lower color resolutions than the color resolution of the original image is important to reduce system costs, especially for portable LCD-based devices.

Reproducing an image at a lower color resolution requires construction of a palette of colors from which the system can select a color to display as a facsimile of the original pixel color. In other words, in a system with eight bit color only 256 colors will be available to replicate the color of each pixel of an image even though the original color of the pixel may have been selected from a palette of more than 16.7 million colors. A principal objective in constructing a palette is to optimize the selection of colors so that images reproduced at a lower resolution are perceived to contain the same colors or colors that are very close to those of the original image. Several methods of optimizing the selection of colors for a palette have been developed, as described below.

One approach to selecting the colors for a palette is to determine which colors appear most frequently in an image and to fill the palette with the most frequently appearing colors. For example, in an 8 bit system the 256 colors appearing most frequently in the image would be used in the palette. The color of each pixel is mapped to the closest color in the palette when the image is reproduced. This approach may produce a high quality reproduction because any single image is likely to contain relatively few colors and it is likely that the true color of the pixel, or a color very near the pixel's true color, will be in the palette. However, image dependent palettes are usually undesirable when several images are presented simultaneously, as in a windowing environment, or when images are presented in rapid succession because palette switching is visually disruptive and computationally intensive. Braudaway, U.S. Pat. No. 4,907,075, and White et al., U.S. Pat. No. 5,130,701, both describe such systems and are incorporated by reference herein.

Another approach is to construct an image independent palette. One method of constructing an image independent palette is to truncate the high bit color representation of the pixel's color. In this approach the least significant digits of the triplets making up the high bit color representation are discarded until the number of bits remaining corresponds to the system's bit depth. A substantial part of the information provided by the original high bit color description is lost in the truncation process. In addition, the color produced by the display can vary substantially from the pixel's true color.

A complicating factor in choosing optimal colors for a palette for a lower color resolution image reproduction is that more than one system is used to describe color in digital systems. Generally, output devices for digital systems require that a color be defined in terms of the intensities of its red, green, and blue (RGB) components. The RGB color model is a cube in a Cartesian coordinate system with red usually being on the x-axis, blue usually being on the z-axis, and green usually being on the y-axis. Black (minimum intensity of red, green, and blue) is located at the intersection of the red, green, and blue axes and white (maximum intensity of red, green, and blue) is located at the corner diagonally up and across the RGB cube from black. The diagonal between the black and white corners of the RGB color gamut is the gray scale. Any color in the cubic gamut of colors is defined by a point located by the red, green, and blue coordinates. RGB color description is suitable for monitors because the cathode ray tube (CRT) composes each pixel from three subpixels; one having a principally red phosphor, one having a principally green phosphor, and one having a principally a blue phosphor. Alternatively, some monitors include a "white" phosphor together with suitable filters to provide RGB output. In a system with 24 bit color depth the color descriptor is composed of an ordered triplet specifying the intensities of red (8 bits), green (8 bits), and blue (8 bits). The intensity of each of the colors (red, green, and blue) is mapped to a memory which outputs the correct voltage to each of the three electron guns in the CRT causing the three phosphors to output the correct light intensity to achieve the specified color for the pixel. Unfortunately, the RGB mapping is device dependant because the actual color produced depends upon the device. To be optimized for human perception, the color palette must take into account the nonlinear relationship of input and output intensity of the display device which is generally referred to as the gamma function of the device.

A color model utilized in many digital video systems is the YC$_B$C$_R$ (YUV) color model. The YC$_B$C$_R$ color space also describes color using an ordered triplet. The ordered triplet specifies three different parameters, namely, luminance (Y), chrominance-blue (C$_B$), and chrominance-red (C$_R$). The YC$_B$C$_R$ color model is also a cube at the intersection of three axes of a Cartesian coordinate system. As with the RGB color model, black (minimum luminance, chrominance-blue, and chrominance-red) in the YC$_B$C$_R$ color gamut cube is located at the intersection of the axes of the color space. In the YC$_B$C$_R$ color model white (maximum luminance, minimum chrominance blue and minimum chrominance red) lies on the Y-axis. In recent years, the YC$_B$C$_R$ color model has become common for image description because research has shown that significant improvement in the compressibility of image data is possible with this color representation. Image compression reduces the memory requirements to store the image and the bandwidth requirements to transmit it. JPEG, MPEG, and H.261/H.263 image and video compression standards all use $YC_BC_R$ color components. Digital television also uses $YC_BC_R$ color components.

$YC_BC_R$ color data can be converted to RGB data, and vice versa, by a matrix transformation. If there is sufficient bit depth a simple mathematical transformation may be satisfactory to transform between $YC_BC_R$ and RGB. However, when a color palette is used the matrix transformation does not produce an optimal palette. When the RGB color gamut is superimposed on the $YC_BC_R$ color gamut, the RGB and $YC_BC_R$ color gamuts only partially overlap. In other words, $YC_BC_R$ color data from a source such as digital video can define colors that are not physically realizable by an RGB device. Including colors from regions of the $YC_BC_R$ color gamut which are not in the RGB color gamut in a palette of RGB colors is a suboptimal use of the limited number of entries available in the color palette.

One technique of selecting a color palette is to subdivide each coordinate axis into segments, then choosing a color point for each color volume. This technique is grossly inefficient for the situation of displaying $YC_BC_R$ images in RGB space, because any regular segmentation for the $YC_BC_R$ axes results in a significant number of color volumes which fall partially or wholly outside the RGB color cube, thus representing colors which are not physically realizable.

Another limitation associated with transforming $YC_BC_R$ color data to RGB color data is that equal incremental differences in the luminance parameter (Y) do not correspond to equal changes in the luminance as perceived by the eye. Friedman et al., U.S. Pat. No. 5,398,120, describe a system for selecting colors for a lower resolution RGB palette. Colors selected for the palette are located at the intersections of three sets of parallel planes projecting perpendicular, respectively, to each the Y, $C_B$, and $C_R$ axes. The spacing of the planes projecting perpendicular to the Y axis is determined using a cubic function. The cubic function does not include consideration of the contribution of the gamma transfer function of the display to human perception of luminance and therefore does not produce perceptually equal gradations of luminance. Further, no method of selecting appropriate palette colors for other than a 12 bit color resolution is described. In addition, the disclosed technique of ordered dithering does not compensate for error introduced by the necessity to display out-of-gamut colors with palette color choices.

Current NTSC television typically receives signals in the form of Y (luminance), I (in phase), and Q (out of phase). The luminance component (Y) is a mixture of red, green, and blue and tends to be most sensitive to green. The in-phase (I) component is generally considered the red component. The out of phase (Q) component is generally considered the blue component. The typical ratios of the Y, I, and Q are [4, 1, 1/4] to approximate the optical characteristics of the human visual system. Accordingly, less of the blue component (Q) is transmitted than the red component (I) which, in turn, is generally less than the green component (Y). To further reduce the bandwidth requirements normally the Q component is amplitude limited.

What is desired, therefore, is a method for constructing a color palette which produces a perceptually optimal distribution of colors for use in reproducing original images having a higher color resolution and represented by color data in the $YC_BC_R$ color space on a device of lower resolution requiring color data in the RGB color space.

SUMMARY OF THE INVENTION

The present invention overcomes the aforementioned drawbacks of the prior art by providing a method for constructing a perceptually optimized color palette for use in reproducing an image at a lower color resolution than the color resolution of the original image. The method includes the steps of defining the gamut of output colors in a three-dimensional color space having a luminance axis, a second axis perpendicular to the luminance axis, and a third axis perpendicular to the luminance axis and the second axis. The color space is divided to produce a three-dimensional grid of intersection colors each located in the color space so that the coordinate intervals between adjacent colors are substantially equal in the directions of the second and third axes, and substantially perceptually equal in the direction of the luminance axis. An intersection color is included in the color palette if it is located inside the boundary of the gamut of output colors. An intersection color located outside of the boundary of the gamut of output colors is included in the palette if it is closer to the boundary than any other color of the same luminance coordinate which is immediately adjacent thereto. The second and third axis coordinates of colors included in the palette which are nearer the boundary of the gamut of output colors than any adjacent palette color of the same luminance coordinate are modified to move the color to the boundary or corners of the gamut. Such colors included in the palette are moved to the nearest color on the boundary of the gamut of output colors. If a corner of the boundary is closer to such a color included in the palette than it is to any other color of the same luminance included in the palette then that closest color will be moved to the corner color without regard to whether the corner color is the nearest color on the boundary. In addition, colors in the palette, but not those on the boundary of the gamut, may be replaced by colors with adjusted coordinates if incremental adjustment of the luminance, second axis, and third axis coordinates reduces the total variation of the colors in the palette.

The present invention provides a method of converting colors in the $YC_BC_R$ color space which is commonly used when storing or processing color in a digital electronic system to a palette of colors in the RGB color space which is required for most display devices. Colors which are not realizable as RGB colors are not included in the palette. The method produces a perceptually optimized palette of colors adjusted for the gamma function of the display device to be used in displaying an image on a device with lower color resolution than that of the original image. A palette of any size can be created as required by the application.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Color is a perceived representation of the distribution of photon energy quanta within the visual spectrum reflected or emitted by an object. A color space is a model that attempts to map magnitudes of parameters that are sources of color into a multidimensional space representing colors as perceived by humans. Several different color spaces are of interest in digital electronics. Two of particular importance are the $YC_BC_R$ and RGB color spaces.

The $YC_BC_R$ color gamut is a cube located at the intersection of three axes on which can be represented the magnitudes of three parameters describing color: Y (luminance), $C_B$ (chrominance-blue), and $C_R$ (chrominance-red). Each point in the gamut of colors is a color which is specified by the values of the Cartesian coordinates, Y, $C_B$, and $C_R$. For example, in the $YC_BC_R$ color gamut black (minimum luminance, chrominance-blue, and chrominance-red) is the corner of the cube located at the intersection of the Y, $C_B$, and $C_R$ axes. In the $YC_BC_R$ color space white (maximum luminance, minimum chrominance-blue, and minimum chrominance red) is the corner of the cube lying on the Y-axis. The gray scale is coincident with the Y-axis spread over the interval between black and white. The $YC_BC_R$ color space is of particular interest in digital systems because images are commonly stored, processed, and transmitted as $YC_BC_R$ color data.

On the other hand, most output devices deal with color as data in the RGB (red, green, blue) color space. For example, the pixels of a color cathode ray tube (CRT) are each divided into three subpixels one having primarily a red phosphor, one having primarily a green phosphor, and one having primarily a blue phosphor. The color of the pixel is sum of the intensities of the red, green, and blue (RGB) subpixels. The RGB color gamut is also a cube. On a coordinate system with red, green, and blue axes, black is located at the intersection of the three axes (minimum intensity of red, green, and blue) and white (maximum intensity of red, green, and blue) is located on the corner of the cube diagonally up and across the cube from black. The gray scale lies on the diagonal connecting the black and white corners of the cube.

Since color image data is commonly stored and processed as $YC_BC_R$ data and displayed from RGB data the conversion of $YC_BC_R$ data to RGB is a common occurrence in a digital system. Conversion of $YC_BC_R$ color data to RGB color data may be accomplished through matrix transformation. With sufficient bit depth the conversion is straight forward. However, in many cases the output device has a lower color resolution than the original image, such as is the case with an LCD display. In such cases a palette with a limited number of RGB specified colors must be constructed.

Figure 1:
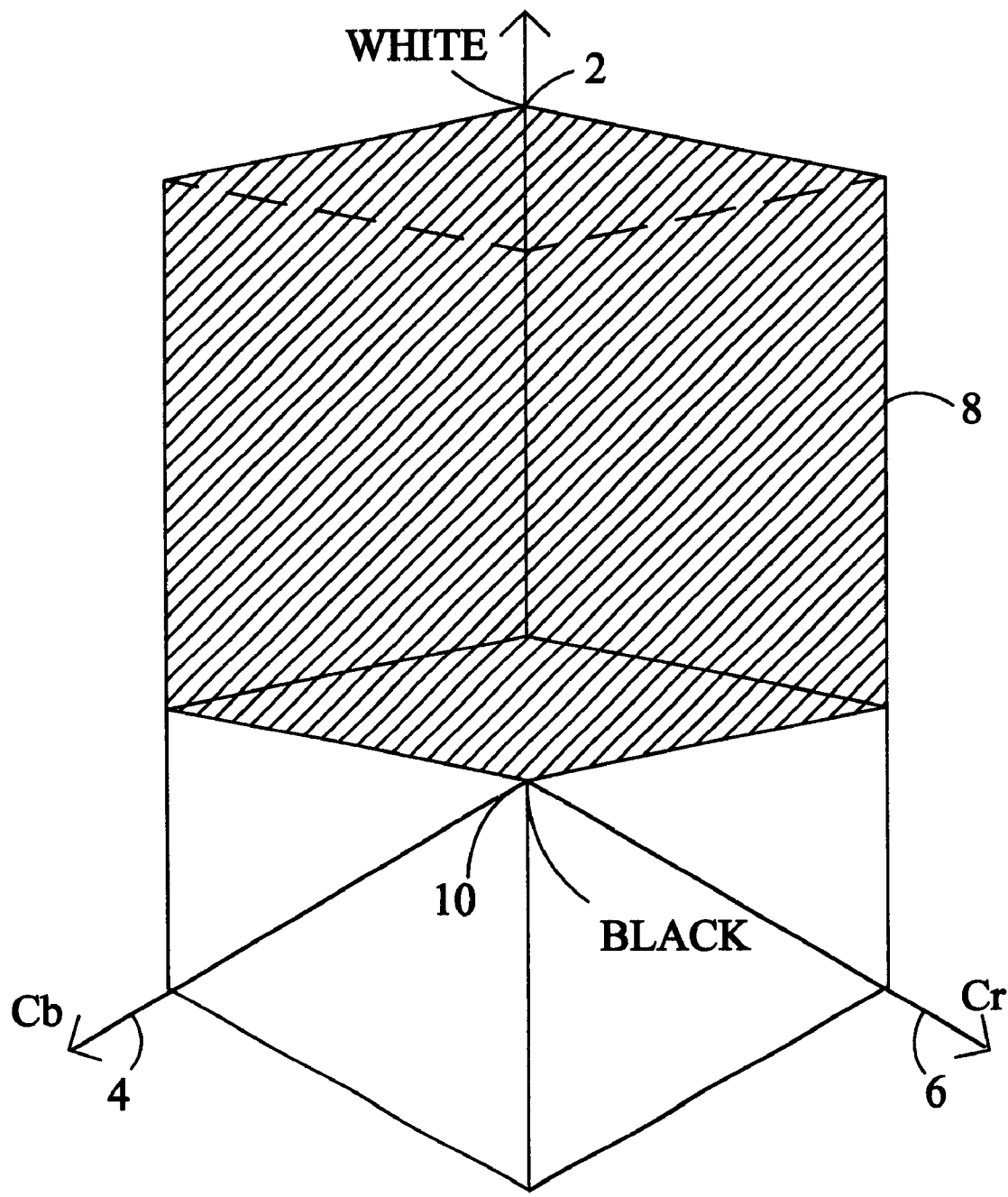
FIG. 1 illustrates the RGB (red, green, blue) color gamut defined in the $YC_BC_R$ color space.

The present invention provides a system for constructing a perceptually optimized palette of RGB colors suitable for converting $YC_BC_R$ data to RGB data for display on a device with lower color resolution. Referring to FIG. 1, to construct the palette the RGB color model is mapped to the $YC_BC_R$ color space. Mapped on the Y axis 2, $C_B$ axis 4, and $C_R$ axis 6, the RGB cube 8 rests on the black corner at the intersection of the axes 10 with the white corner on the Y axis, vertically above black. The gray scale is coincident with the Y-axis between the white and black corners of the cube.

Figure 2:
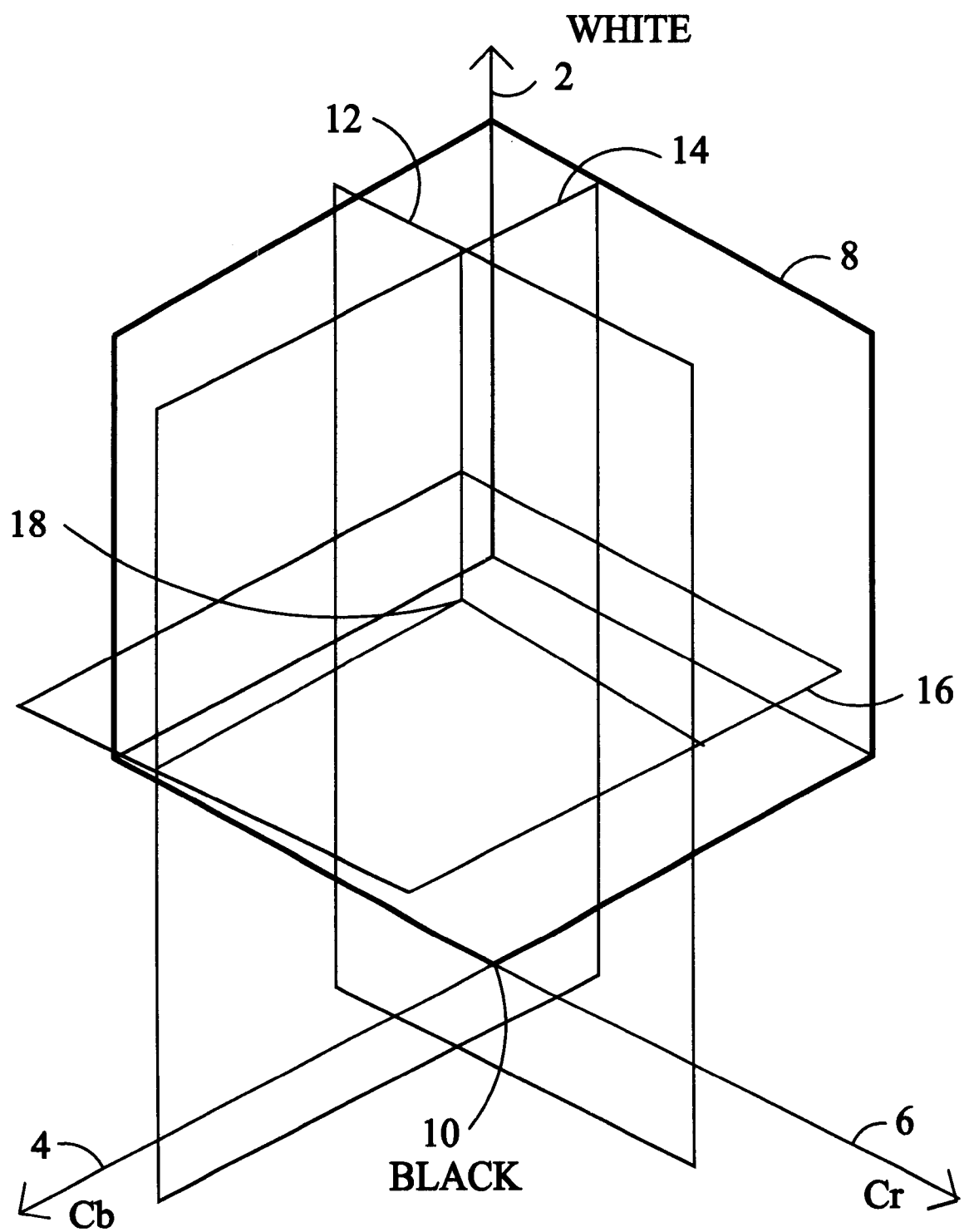
FIG. 2 illustrates the RGB (red, green, blue) color gamut defined in the $YC_BC_R$ color space which is divided by planes projecting perpendicular to the Y, $C_B$ and $C_R$ axes.

Referring to FIG. 2, to establish an initial group of candidate colors for inclusion in the palette, a set of parallel planes is projected perpendicular to each of the Y axis 2, $C_B$ axis 4, and $C_R$ axis 6. Planes are placed at $C_B$ and $C_R$ coordinate values of 16 and 240 which are the minimum and maximum coordinates on the $C_B$ and $C_R$ axes of the RGB color gamut. Additional parallel $C_B$-planes (such as $C_B$-plane 12) and $C_R$-planes (such as $C_R$-plane 14) are located along the $C_B$ and $C_R$ axes dividing the interval between the minimum and maximum planes into a plurality of equal intervals.

To perceptually optimize the resulting palette, the coordinate interval along the Y-axis is divided in increments which will produce substantially perceptually equal changes in luminance. Planes are projected from the Y-axis at the minimum and maximum Y-coordinate values for the RGB color space, 16 and 235. The space between the minimum and maximum planes is divided into perceptually equal intervals. To determine the appropriate intervals the $YC_BC_R$ triplets (24 bit color descriptors comprising three eight bit numbers specifying the magnitudes of the Y, $C_B$, and $C_R$ parameters) are converted to CIE-L*a*b* triplets. The CIE (Commission Internationale de l'Eclairage) L*a*b* color space is a perceptually uniform color space. In other words, if two colors are equally distant in the color space as specified by L*, a*, and b* coordinates the colors will be perceptually equally distant.

To convert the $YC_BC_R$ color data to CIE- L*a*b* color data the 24 bit $YC_BC_R$ triplet is first converted to an R'G'B' color triplet. Each of the parameters R', G' and B' has the range of 0–1. The conversion is accomplished with the matrix conversion:

$$\begin{bmatrix} R' \\ G' \\ B' \end{bmatrix} = \begin{bmatrix} 0.00456621 & 0 & 0.00625893 \\ 0.00456621 & -0.00153632 & -0.00318811 \\ 0.00456621 & 0.00791071 & 0 \end{bmatrix} \cdot \left( \begin{bmatrix} Y \\ C_B \\ C_R \end{bmatrix} - \begin{bmatrix} 16 \\ 128 \\ 128 \end{bmatrix} \right)$$

The R'G'B' data are then corrected for the non-linear relationship between the input and output intensity of the display device, known as the gamma function. For a direct view CRT display Y is typically 2.5. This correction yields RGB color data values in the ranges $0 \leq R,G,B \leq 1$. The gamma correction is made as follows:

$R = R'^Y$ $G = G'^Y$ $B = B'^Y$

The RGB triplets are then converted to triplets in the CIE-XYZ color space. The CIE-XYZ color space is an international standard capable of representing all colors. Colors in the CIE-XYZ color space have coordinate values in the range of $0 \leq X,Y,Z \leq 1$. This conversion is accomplished through the matrix conversion:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R \\ G \\ B \end{bmatrix}$$

The CIE-XYZ color descriptions are then converted to CIE-L*a*b* color space data by the following equations:

$$L^* = \begin{cases} 116 \, Y^{1/3} - 16, & 0.008656 < Y \\ 903.3 \, Y, & 0 \leq Y \leq 0.008656 \end{cases}$$

$$a^* = 500 \left[ \left( \frac{X}{0.950456} \right)^{1/3} - Y^{1/3} \right]$$

-continued $$b^* = 200\left[Y^{1/3} - \left(\frac{Z}{1.088754}\right)^{1/3}\right]$$

The resulting CIE-L*a*b* coordinates are used to compute the location of the Y-planes 16 to produce perceptually equal divisions of the Y-axis between the minimum and maximum Y-planes. The Y-planes are planes projecting into the $YC_BC_R$ color space perpendicular to the Y-axis 2. Alternative perceptually uniform color spaces, such as CIE-LUV, could be substituted for the CIE-L*a*b* color space to construct perceptually optimized palettes. The planes projecting perpendicular to the three axes divide the color space into a three dimensional grid. Colors located at the intersections of the planes are candidates for inclusion in the palette. For example, intersection color 18 would be a candidate for inclusion in the palette.

Figure 3:
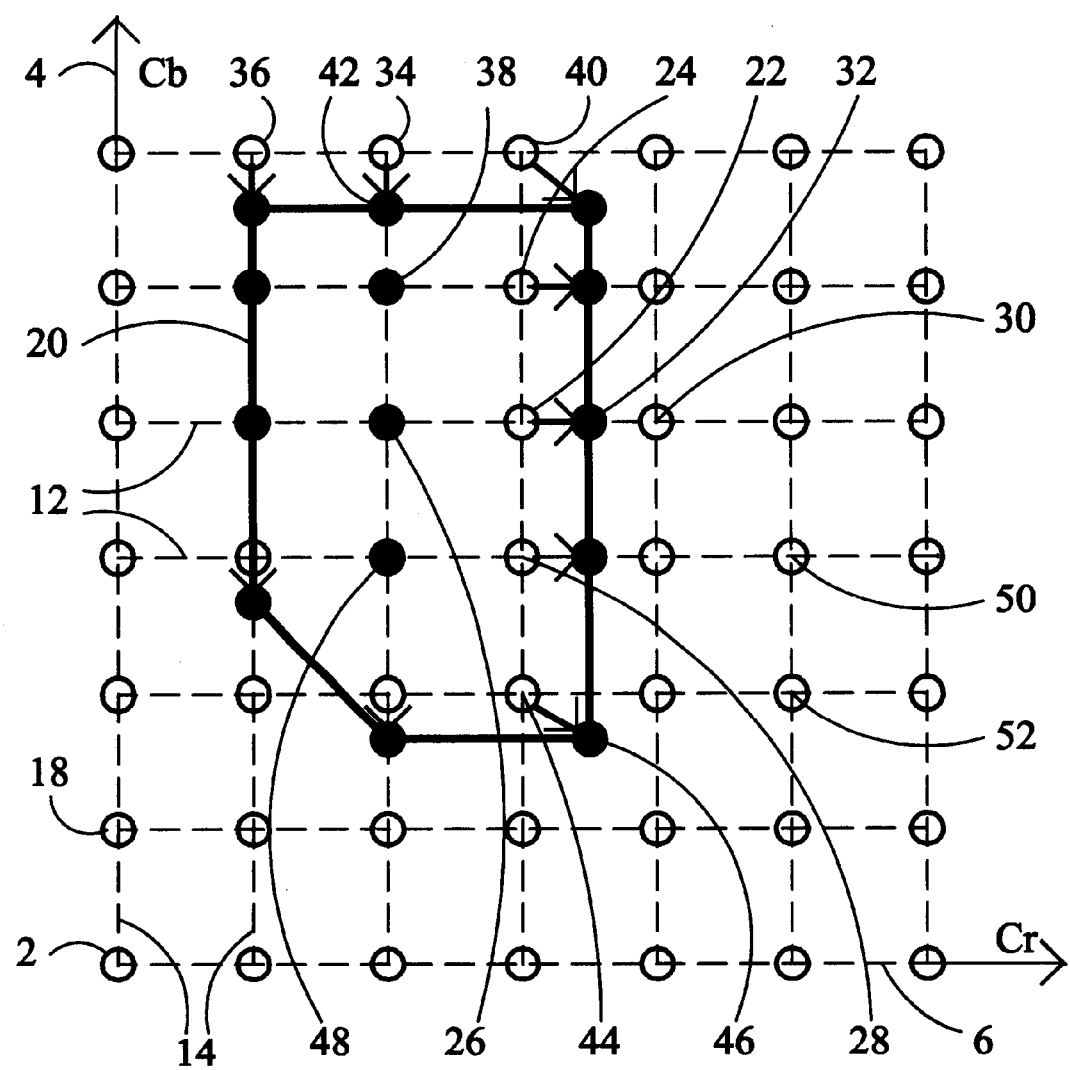
FIG. 3 illustrates the RGB color gamut at an exemplary plane perpendicular to the luminance axis.

FIG. 3 illustrates an exemplary Y-plane with intersecting $C_B$-planes 12 and $C_R$-planes 14. Intersection colors 18 are illustrated as small circles at the intersections of the $C_B$-planes 12 and $C_R$-planes 14. The gamut of RGB colors 20 for this level of luminance is the cross-section of RGB color space represented by the polygon. Intersection colors 18 located inside or on the boundary of the RGB gamut 20 are physically realizable as RGB specified colors. Intersection colors 18 located outside of the boundary of the RGB gamut 20 are not realizable as RGB specified colors.

Each intersection color 18 in a Y-plane is evaluated to determine if that intersection color 18 is closer to the boundary of the RGB gamut 20 than any intersection color 18 adjacent to the intersection color 18 being evaluated. If an intersection color 18 being evaluated is as close or closer to the boundary of the gamut 20 than any adjacent intersection color 18, the color located on the boundary nearest the intersection color being evaluated will be added to the palette. For example, referring to FIG. 3 the particular intersection color 22 is evaluated and found to be as close or closer to the gamut boundary 20 than any other intersection color 24, 26, 28, or 30 adjacent to the intersection color being evaluated 22. Therefore, the color on the boundary of the gamut 32 which is the closest to the intersection color 22 under evaluation will be selected for inclusion in the palette. Intersection color 34 is outside the RGB gamut and is not physically realizable as an RGB color. However, since the intersection color 34 is as close or closer to the gamut boundary than any adjacent intersection color 36, 38, or 40, the nearest color on the boundary of the gamut (color 42) will be added to the palette. On the other hand, if an intersection color being evaluated, for example color 44, is closer to a corner of the gamut boundary 46 than any adjacent intersection color then the color at the corner of the gamut boundary 46, which may not be the nearest color on the boundary to the intersection color being evaluated, is chosen for entry in the palette. Finally, any intersection color located within the gamut boundary, for example colors 26, 38, and 48, which is not as close or closer to the boundary of the gamut 20 than the intersection colors adjacent to it is added to the palette. This evaluation and selection of colors has the effect of adjusting intersection colors to the boundary and the corners of the color gamut 20 thereby ensuring that the palette contains the most fully saturated colors available in the gamut. Intersection colors which are not realizable as RGB colors are discarded by the process. Such an example are colors 50 and 52,.

Following selection of colors for the palette, the selected colors may be refined to produce the final palette. In the refinement step, colors are examined successively and moved incrementally, with distances measured in CIE-L*a*b* units, in the Y, $C_B$ and $C_R$ directions to determine if movement of the color would reduce the total variance of the perceptual distance between all (or substantially all) pairs of immediately adjacent colors in the palette. The standard deviation can be used to measure the total variance of the perceptual distance between all pairs of immediately adjacent colors in the palette. Colors at the boundary of the gamut 20 are not moved off the boundary to ensure that all maximally saturated colors are available at each Y-plane 16 of the palette.

Using the method of the present invention the Y, $C_B$, and $C_R$ axes 2, 4, and 6 may be divided into intervals appropriate to produce perceptually optimal palettes suitable for a variety of applications. Considerations include selecting a number of planes which will produce the desired number of intersections to fill a palette of a specified size. For example, applying the method of the present invention with six Y-planes 16, 13 $C_B$-planes 12 and 12 $C_R$-planes 14 yields a palette of 223 colors with a mean spacing of 24.0 units and a standard deviation of 7.8 units.

A palette might be chosen for some secondary consideration. Such a secondary consideration might be the desire to maintain points at each Y-plane 16 which are gray or nearly gray. This may be accomplished by dividing the $C_B$ and $C_R$ axes 4 and 6 into odd numbers of intervals. As a result, palette colors will be obtained which are close to or on the Y-axis 2 and exhibit minimal coloration. For example, seven divisions of the Y axis 2, 15 divisions of the $C_B$ axis 4, and 9 divisions of the $C_R$ axis 6 will yield a palette of 245 colors with a mean spacing of 24.2 units and a standard deviation of 9.5 units. Increasing the number of Y intervals to nine, with 11 $C_B$ intervals, and nine $C_R$ intervals produces a palette with 241 entries with a mean spacing of 26.0 units and a standard deviation of 9.5 units.

Mapping $YC_BC_R$ triplets to color palettes constructed in accordance with the present invention may proceed by any of a number of known techniques. For example, intermediate look-up tables for Y, $C_B$, and $C_R$ parameters may be constructed each of which contains a table offset. When the three separate offsets for any given $YC_BC_R$ triplet are added, the result is an index into a fourth intermediate table. The fourth intermediate table yields a palette entry address. The fourth intermediate table is preferably constructed so that each corresponding triplet value is mapped to the palette entry which is perceptually closest to the given $YC_BC_R$ triplet. As an alternative, indices into the fourth intermediate table may be computed by standard array offset techniques. The required size of the fourth intermediate table is the product of the number of divisions along the three (Y, $C_B$ and $C_R$) axes. A palette constructed from seven Y axis divisions, 15 $C_B$ axis divisions and nine $C_R$ axis divisions would require 945 entries, each of which would refer to one of 245 palette entries.

Dithering can be used in conjunction with palettes constructed in accordance with the present invention. Since the color represented by any palette entry will exhibit some error from most $YC_BC_R$ triplets mapped to the palette entry, error diffusion dithering can reduce visual image distortion by diffusing the error to adjacent pixels. Error diffusion techniques are well known in the art. When used with error diffusion dithering, the final palette will consist of a set of palette entries, each with an RGB triplet which is presented to the display system, and the corresponding $YC_BC_R$ triplet, which is used to compute the error resulting from mapping the input $YC_BC_R$ triplet to the palette value. This error is then diffused to neighboring $YC_BC_R$ triplets.

While the technique has been described in reference to the conversion of $YC_BC_R$ to RGB, the same general technique of mapping the color spaces in general relation to their overlapping portions can be extended to other color spaces. One example would be YIQ to RGB. This mapping of generally overlapping portions allows for a more optimal color palette. The aspect of perceptually weighting the color palette in accordance with any suitable model of the human visual system in view of the physical characteristics of the display device allows a more optimal palette for reproducing the image. One or more of these features could be included in a particular system. In addition, the system does not rely on the analysis of the source material but in contrast is based on the present inventor's realization of the type of encoding systems used, the human visual system, and the characteristics of the display device.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method for constructing a color palette for use in reproducing an image at a lower color resolution than the color resolution of the original image comprising the steps of:
   (a) defining a gamut of output colors in a three dimensional color space having;
      (1) a luminance axis;
      (2) a second axis perpendicular to said luminance axis: and
      (3) a third axis perpendicular to said luminance axis and said second axis;
   (b) dividing said three dimensional color space to produce a three dimensional grid of intersection colors each located in said color space so that the coordinate intervals between adjacent colors are;
      (1) substantially equal in the directions of said second axis and said third axis; and
      (2) substantially perceptually equal in the direction of said luminance axis;
   (c) including in said palette said intersection colors which are;
      (1) located inside the boundary of said gamut of output colors; and
      (2) located outside of the boundary of said gamut of output colors but closer to said boundary than any other color of the same luminance coordinate which is immediately adjacent thereto; and
   (d) modifying the coordinates for said second and third axis to move each said intersection color included in said palette that is nearer to a respective portion of said boundary than any immediately adjacent intersection color to the nearest color on said boundary or, instead, to a corner color of said boundary if said intersection color is closer to said corner color than is any other intersection color of the same luminance included in said palette.

2. The method for constructing a color palette of claim 1 wherein the output color gamut is the three dimensional gamut of colors created by adding red, green and blue color (RGB) components.

3. A method for constructing a color palette for use in reproducing an image at a lower color resolution than the color resolution of the original image comprising the steps of:
   (a) defining a gamut of output colors in a three dimensional color space having;
      (1) a luminance axis;
      (2) a second axis perpendicular to said luminance axis: and
      (3) a third axis perpendicular to said luminance axis and said second axis;
   (b) dividing said three dimensional color space to produce a three dimensional grid of intersection colors each located in said color space so that the coordinate intervals between adjacent colors are;
      (1) substantially equal in the directions of said second axis and said third axis; and
      (2) substantially perceptually equal in the direction of said luminance axis;
   (c) including in said palette said intersection colors which are;
      (1) located inside the boundary of said gamut of output colors; and
      (2) located outside of the boundary of said gamut of output colors but closer to said boundary than any other color of the same luminance coordinate which is immediately adjacent thereto;
   (d) modifying the coordinates for said second and third axis to move each said intersection color included in said palette to the nearest color on the boundary of said color gamut or to a corner color of said color gamut if at least one of said boundary and said corner color is closer to said intersection color included in the palette than said corner color is to any other intersection color of the same luminance included in said palette;
   (e) modifying the coordinates of each color include in said palette incrementally in each direction of said luminance, second and third axes, and
   (f) substituting in said palette the color resulting from modification for said color before modification if the total variation of the perceptual distance between all pairs of immediately adjacent colors in said palette would be minimized by the substitution.

4. The method for constructing a color palette of claim 3 wherein the total variation of the perceptual distance between all pairs of immediately adjacent colors in said palette is determined by the standard deviation of said perceptual distance of all said pairs of immediately adjacent colors in the palette.

5. A method for constructing a color palette for use in reproducing an image at a lower color resolution and in a different color gamut than the original image comprising the steps of:
   (a) defining a three dimensional input color space having;
      (1) a luminance axis;
      (2) a second axis perpendicular to said luminance axis; and
      (3) a third axis perpendicular to said luminance axis and said second axis;
   (b) defining an output color gamut in said input color space said output color gamut having a black to white axis coincident with said luminance axis;
   (c) identifying a set of intersection colors located at the intersections of a plurality of planes projecting perpendicular to each of said luminance axis, said second axis and said third axis and said planes being located at coordinates;
      (1) intersecting the boundary of said output color gamut at its maximum and its minimum coordinates for each of said luminance axis, said second axis and said third axis; and (2) dividing the interval between said planes located at said maximum and said minimum coordinates for said second axis and said third axes into a plurality of equal intervals; and
(3) dividing the interval between said planes located at said maximum and said minimum coordinates for said luminance axis into a plurality of perceptually equal intervals;
(d) comparing, for each intersection color, the distance from the subject intersection color to said boundary of said output color gamut with the distances to said boundary of said output color gamut from each intersection color, in the same plane perpendicular to said luminance axis, adjacent to said subject intersection color; and
(e) entering in said color palette;
(1) each intersection color located inside said boundary of said output color gamut which, when compared to said intersection colors immediately adjacent thereto, is not the nearest intersection color to said boundary; and
(2) each respective intersection color which, when compared to said intersection colors immediately adjacent thereto, is as near or nearer to said boundary than any of said adjacent intersection colors, after moving said respective intersection color to the nearest color on said boundary or, instead, to a corner color of said boundary if said respective intersection color is closer to said corner color than is any other intersection color of the same luminance.

6. The method for constructing a color palette of claim 5 wherein the output color gamut is the three dimensional gamut of colors created by adding red, green and blue color (RGB) components.

7. The method for constructing a color palette of claim 5 wherein said second axis is the axis for the chrominance-blue component of the color and said third axis is the axis for the chrominance-red component of said color.

8. A method for constructing a color palette for use in reproducing an image at a lower color resolution and in a different color gamut than the original image comprising the steps of:
(a) defining a three dimensional input color space having;
(1) a luminance axis;
(2) a second axis perpendicular to said luminance axis; and
(3) a third axis perpendicular to said luminance axis and said second axis;
(b) defining an output color gamut in said input color space said output color gamut having a black to white axis coincident with said luminance axis;
(c) identifying a set of intersection colors located at the intersections of a plurality of planes projecting perpendicular to each of said luminance axis, said second axis and said third axis and said planes being located at coordinates;
(1) intersecting the boundary of said output color gamut at its maximum and its minimum coordinates for each of said luminance axis, said second axis and said third axis; and
(2) dividing the interval between said planes located at said maximum and said minimum coordinates for said second axis and said third axes into a plurality of equal intervals; and
(3) dividing the interval between said planes located at said maximum and said minimum coordinates for said luminance axis into a plurality of perceptually equal intervals;
(d) comparing, for each intersection color, the distance from the subject intersection color to said boundary of said output color gamut with the distances to said boundary of said output color gamut from each intersection color, in the same plane perpendicular to said luminance axis, adjacent to said subject intersection color;
(e) entering in said color palette;
(1) each intersection color located inside said boundary of said output color gamut which, when compared to said intersection colors adjacent thereto, is not the nearest intersection color to said boundary; and
(2) for each intersection color which, when compared to said intersection colors adjacent thereto, is as near or nearer to said boundary than any of said adjacent intersection colors, the color at said boundary of said output color gamut which is closest to said intersection color or the color at the corner of said boundary if said corner is nearer to said intersection color than to any intersection color adjacent to said corner;
(f) modifying the coordinates of each color included in said palette incrementally in each direction of said luminance, second and third axes; and
(g) substituting in said palette the color resulting from modification for said color before modification if the total variation of the perceptual distance between all pairs of immediately adjacent colors in said palette would be minimized by the substitution.

9. The method for constructing a color palette of claim 8 wherein the total variation of the perceptual distance between all pairs of immediately adjacent colors in said palette is determined by the standard deviation of said perceptual distance between all pairs of immediately adjacent colors in the palette.

10. A method for constructing a color palette for use in reproducing an image at a lower color resolution and in a different color gamut than the original image comprising the steps of:
(a) defining a three dimensional input color space having;
(1) a luminance axis;
(2) a second axis perpendicular to said luminance axis; and
(3) a third axis perpendicular to said luminance axis and said second axis;
(b) defining an output color gamut in said input color space said output color gamut having a black to white axis coincident with said luminance axis;
(c) identifying a set of intersection colors located at the intersections of a plurality of planes projecting perpendicular to each of said luminance axis, said second axis and said third axis and said planes being located at coordinates;
(1) intersecting the boundary of said output color gamut at its maximum and its minimum coordinates for each of said luminance axis, said second axis and said third axis; and
(2) dividing the interval between said planes located at said maximum and said minimum coordinates for said second axis and said third axes into a plurality of equal intervals; and
(3) dividing the interval between said planes located at said maximum and said minimum coordinates for said luminance axis into a plurality of perceptually equal intervals including by (a) converting a $YC_BC_R$ color triplet to an R'G'B' color triplet;
(b) correcting said R'G'B' color triplet for the display gamma function to yield an RGB color triplet;
(c) converting said RGB color triplet to a CIE-XYZ color triplet; and
(d) converting said CIE-XYZ color triplet to a color triplet in a perceptually uniform color space;

(d) comparing, for each intersection color, the distance from the subject intersection color to said boundary of said output color gamut with the distances to said boundary of said output color gamut from each intersection color, in the same plane perpendicular to said luminance axis, adjacent to said subject intersection color; and (e) entering in said color palette;
(1) each intersection color located inside said boundary of said output color gamut which, when compared to said intersection colors adjacent thereto, is not the nearest intersection color to said boundary; and
(2) for each intersection color which, when compared to said intersection colors adjacent thereto, is as near or nearer to said boundary than any of said adjacent intersection colors, the color at said boundary of said output color gamut which is closest to said intersection color or the color at the corner of said boundary if said corner is nearer to said intersection color than to any intersection color adjacent to said corner.

11. The method for constructing a palette of claim 10 wherein said perceptually uniform color space is the CIE-L*a*b* color space.

12. The method for constructing a palette of claim 10 wherein said perceptually uniform color space is the CIE-LUV color space.

13. A method of constructing a color palette for use in reproducing an output image at a different color resolution than the color resolution of the original image comprising the steps of:
(a) defining a first color space for the potential colors in said original image;
(b) defining an output gamut of colors that are potentially realizable in said output image;
(c) constructing said color palette suitable to relate colors from said first color space to said output gamut including moving selected ones of said potential colors to said output gamut such that only colors which are realizable in said output gamut are included within said color palette and said color palette is perceptually weighted in relation to the human visual system.

14. The method of constructing a color palette of claim 13 wherein said first color space is a three dimensional space having:

(a) a luminance axis;
(b) a second axis perpendicular to said luminance axis; and
(c) a third axis perpendicular to said luminance axis and said second axis.

15. The method of constructing a color palette of claim 13 wherein said first color space is the $YC_BC_R$ color space.

16. A method of constructing a color palette for use in reproducing an output image at a different color resolution than the color resolution of the original image comprising the steps of:
(a) defining a first color space for the potential colors in said original image wherein said first color space is the YIQ color space;
(b) defining an output gamut of colors that are potentially realizable in said output image;
(c) constructing said color palette suitable to relate colors from said first color space to said output gamut such that only colors which are realizable in said output gamut are included within said color palette and said color palette is perceptually weighted in relation to the human visual system.

17. The method of constructing a color palette of claim 13 wherein said output gamut of colors is the three dimensional gamut of colors created by adding red, green, and blue color (RGB) components.

18. The method of constructing a color palette of claim 13 further comprising the step of adjusting said color palette to correct for a non-linear relationship of input and output intensity of the device producing said output gamut.

19. The method of constructing a color palette of claim 13 further comprising the step of moving selected ones of said potential colors lying inside and outside said output gamut to the boundary of said output gamut.

20. A method of constructing a color palette for use in reproducing an output image at a different color resolution than the color resolution of the original image comprising the steps of:
(a) defining a first color space for the potential colors in said original image;
(b) defining an output gamut of colors that are potentially realizable in said output image;
(c) constructing said color palette suitable to relate colors from said first color space to said output gamut such that only colors which are realizable in said output gamut are included within said color palette and said color palette is perceptually weighted in relation to the human visual system; and
(d) adjusting said color palette to minimize the total variation of the perceptual distance between all pairs of immediately adjacent colors in said palette.

* * * * *

UNITED STATES PATENT AND TRADEMARK OFFICE
CERTIFICATE OF CORRECTION

PATENT NO.     : 6,326,977 B1
DATED          : December 4, 2001
INVENTOR(S)    : Larry Alan Westerman It is certified that error appears in the above-identified patent and that said Letters Patent is hereby corrected as shown below:

Column 1,
Line 2, replace "RGS" with -- RGB --.

Column 2,
Line 33, delete the "a" between the words "principally" and "blue".
Line 60, replace "chrominance blue" with -- chrominance-blue --.
Line 61, replace "chrominance red" with -- chrominance-red --.

Column 5,
Line 17, replace "chrominance red" with -- chrominance-red --.

Column 6,
Line 38, replace "Y" with -- $\gamma$ --.
Line 42, replace "R=R'$^Y$" with -- R=R'$^\gamma$ --.
Line 44, replace "G=G'$^Y$" with -- G=G'$^\gamma$ --.
Line 46, replace "B=B'$^Y$" with -- B=B'$^\gamma$ --.

Column 7,
Line 64, replace "50 and 52," with -- 50 and 52 --.

Column 9,
Line 31, replace ":" after the word "axis" with -- ; --.

Signed and Sealed this

Fifteenth Day of June, 2004

JON W. DUDAS
*Acting Director of the United States Patent and Trademark Office*